United States Patent [19]
Kato

[11] Patent Number: 5,199,045
[45] Date of Patent: Mar. 30, 1993

[54] COMMUNICATION APPARATUS
[75] Inventor: Ichiro Kato, Tokyo, Japan
[73] Assignee: Canon Kabushiki Kaisha, Tokyo, Japan
[21] Appl. No.: 866,271
[22] Filed: Apr. 13, 1992

Related U.S. Application Data

[60] Continuation of Ser. No. 552,463, Jul. 16, 1990, abandoned, which is a division of Ser. No. 203,084, Jun. 7, 1988, Pat. No. 4,958,359.

[30] Foreign Application Priority Data

Jun. 9, 1987 [JP] Japan ................. 62-142155

[51] Int. Cl.⁵ .................... H04L 27/30; H04B 7/005
[52] U.S. Cl. .......................................... 375/1; 380/34; 455/69; 455/88; 455/92
[58] Field of Search ................. 375/1; 380/34; 455/69, 455/88, 92

[56] References Cited

U.S. PATENT DOCUMENTS

| | | | |
|---|---|---|---|
| 2,678,998 | 5/1954 | Young, Jr. ........................ | 455/69 |
| 2,896,073 | 7/1959 | Westphal ........................ | 455/69 X |
| 3,315,164 | 4/1967 | Ferguson, Jr. et al. ......... | 455/69 X |
| 4,613,990 | 9/1986 | Halpern ............................ | 455/69 X |
| 4,641,322 | 2/1987 | Hasegawa ........................ | 375/1 |
| 4,868,795 | 9/1989 | McDavid et al. ............... | 455/69 X |
| 4,870,698 | 9/1989 | Katsuyama et al. ............ | 455/69 X |
| 4,958,359 | 9/1990 | Kato ................................ | 375/1 |

FOREIGN PATENT DOCUMENTS 0230691 8/1987 European Pat. Off. .......... 455/69

Primary Examiner—Bernarr E. Gregory
Attorney, Agent, or Firm—Fitzpatrick, Cella, Harper & Scinto

[57] ABSTRACT

A spread communication system comprising a receiver, a diffusion convertor for converting a signal from the receiver, a control signal generator for generating a control signal representing an output level of the diffusion convertor, another diffusion convertor for converting data to be transmitted, a transmitter for transmitting data from the another diffusion convertor and a transmission controller for controlling a transmission level of the transmitter in accordance with the control signal from the control signal generator.

32 Claims, 5 Drawing Sheets

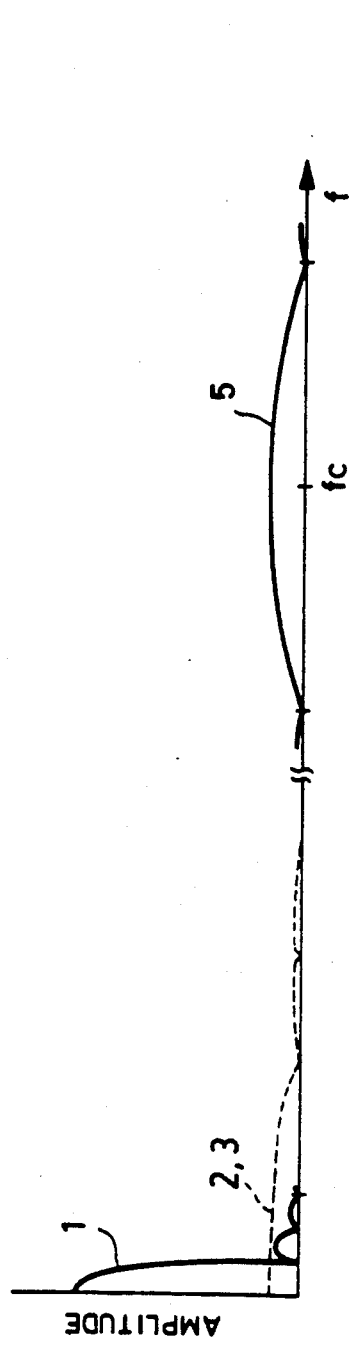
FIG. 3A
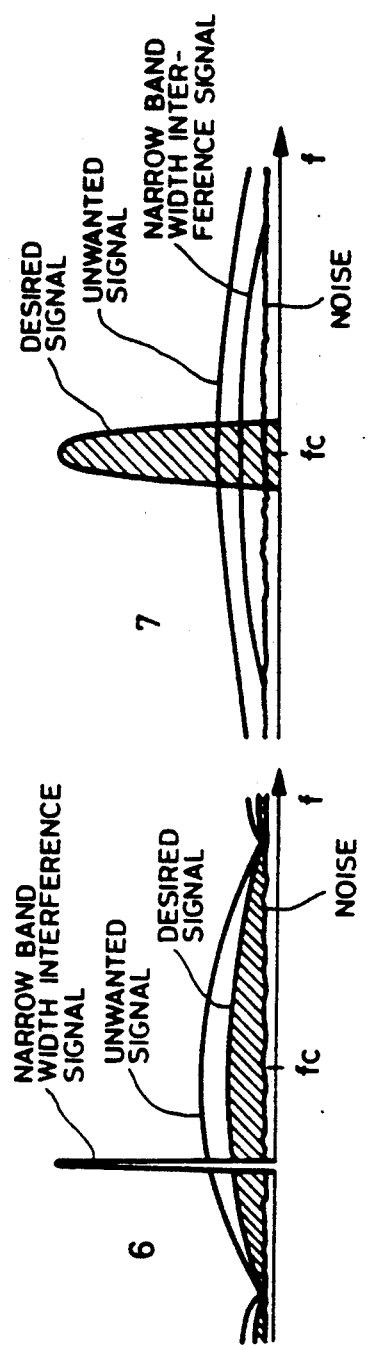
FIG. 3B
FIG. 3C
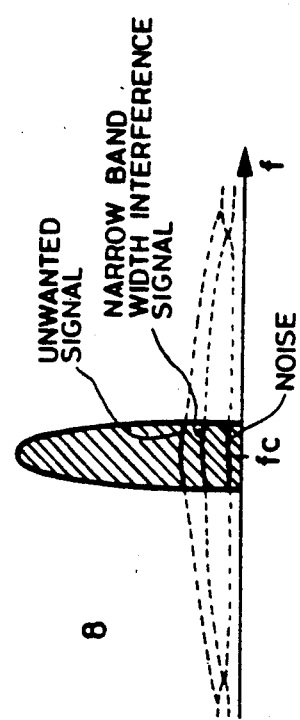
FIG. 3D

COMMUNICATION APPARATUS

This application is a continuation of application Ser. No. 07/552,463 filed Jul. 16, 1990 now abandoned which is a divisional application of 07/203,084 filed Jun. 7, 1988, now U.S. Pat. No. 4,958,359.

BACKGROUND OF THE INVENTION

1. Field of the Invention

The present invention relates to a communication apparatus, and more particularly to a wireless communication apparatus.

2. Related Background Art

A spectrum diffusion (spread spectrum) communication system has been known as one of communication systems. In the spectrum diffusion communication system, a transmitting station converts a base band signal of source data to be transmitted, such as digital audio/video data, to a base band signal having a much wider band width than that of the source data, by using a diffusion (spread) code such as a pseudo noise code. The converted signal is modulated by PSK or FSK modulation system into a high frequency signal, which is then transmitted.

A receiving station demodulates the source data by reverse-diffusion (reverse-spread) which correlates with the received signal by using the same diffusion code as that used in the transmitting station.

An outline of the spectrum diffusion communication is explained with reference to FIGS. 1 to 3.

A source data d(t) applied to a multiplier 6-1 in the transmitting station has a waveform shown by 1 in FIG. 2, and a spectrum shown by 1 in FIG. 3A.

A diffusion code P(t) which is another input signal to the multiplier 6-1 of FIG. 1 has a waveform shown by 2 in FIG. 2 and a spectrum shown by 2 in FIG. 3A. Since the diffusion code P(t) varies much more violently than the source data d(t), the spectrum 2 in FIG. 3A has a much wider band than the spectrum 3.

The data d(t) is multiplied by the diffusion code P(t) by the multiplier 6-1 of FIG. 1 so that it is diffused (spread). The output of the multiplier 6-1 has a waveform shown by 3 in FIG. 2 and a spectrum shown by 3 in FIG. 3A which has a substantially equal band width to that of the spectrum 2. The output signal of the multiplier 6-1 is mixed by a mixer 6-2 with a carrier generated by a local oscillator 6-3. A waveform of the carrier is shown by 4 in FIG. 2. The output of the mixer 6-2 has a waveform shown by 5 in FIG. 2 and a spectrum shown by 5 in FIG. 3A, and it is sent via an antenna 1-3.

In the receiving station, the spectrum of the signal received via an antenna 1-5 of FIG. 6 usually includes the desired signal sent from the transmitting station as well as various signals as shown by 6 in FIG. 3B. They include noises, signals sent by other stations and narrow band interference signal. The received signal including those signals is mixed by a mixer 6-6 with the same diffusion code P(t) as that used in the transmitting station, and it is converted to a signal having a spectrum shown by 7 in FIG. 3C. Namely, the desired signal in the received signal which corresponds to the diffusion code P(t) is reverse-diffused (reverse-spread) and the band width thereof is narrowed in accordance with the band width of the source data. On the other hand, undesired signal, that is, the signal from other station having no identical diffusion code or narrow band interference signal is diffused and converted to a wide band signal.

The diffusion code used for modulation and demodulation is set such that mutual correlation in each communication channel is sufficiently small. Accordingly, when a signal diffused (spread) by a different code is demodulated by reverse-diffusion, it becomes a wide band noise. As a result, only the desired signal can be extracted. Accordingly, multiconnection by code division is attained. Namely, a common frequency may be shared by a plurality of communication channels.

The output signal of the mixer 6-6 is applied to a band-pass filter 6-7 having a band width corresponding to the band width of the source data so that it is converted to a narrow band signal having a spectrum shown by 8 in FIG. 3D. The narrow band signal is demodulated such as by PSK demodulation by a demodulator 6-8 of FIG. 1 to reproduce the source data.

When a number of moving (mobile) radio stations conduct multi-connection by the code division to a multiconnection apparatus which is a single fixed station, the following problem arises. An electric field strength received by the fixed station is higher as the signal is sent from a nearer moving (mobile) station to the fixed station. Accordingly, when the signal sent from a distant moving station is demodulated, the signal sent from a nearby moving station functions as a wide band noise but the electric field strength thereof is much higher than that of the signal from the distant moving station and a noise power which is supplied to an intermediate frequency filter 5 is large. Thus, in the prior art, the performance of the multi-connection is significantly deteriorated by the distance between the radio stations.

SUMMARY OF THE INVENTION

It is an object of the present invention to provide a communication apparatus which can effect exact communication regardless of distance between communication apparatus.

It is another object of the present invention to provide a communication apparatus which can communicate without disturbing other communication.

It is a further object of the present invention to provide a communication apparatus which can communicate without consuming unnecessary power.

It is still a further object of the present invention to provide a spectrum diffusion communication apparatus which resolves a problem of distance and allows multi-connection.

The above and other objects and advantages of the present invention will be apparent from the following description of the invention.

BRIEF DESCRIPTION OF THE DRAWINGS

FIGS. 2 and 3A through 3D show waveforms and spectra of outputs of respective components of the spectrum diffusion communication apparatus.

DETAILED DESCRIPTION OF THE PREFERRED EMBODIMENTS

Figure 4:
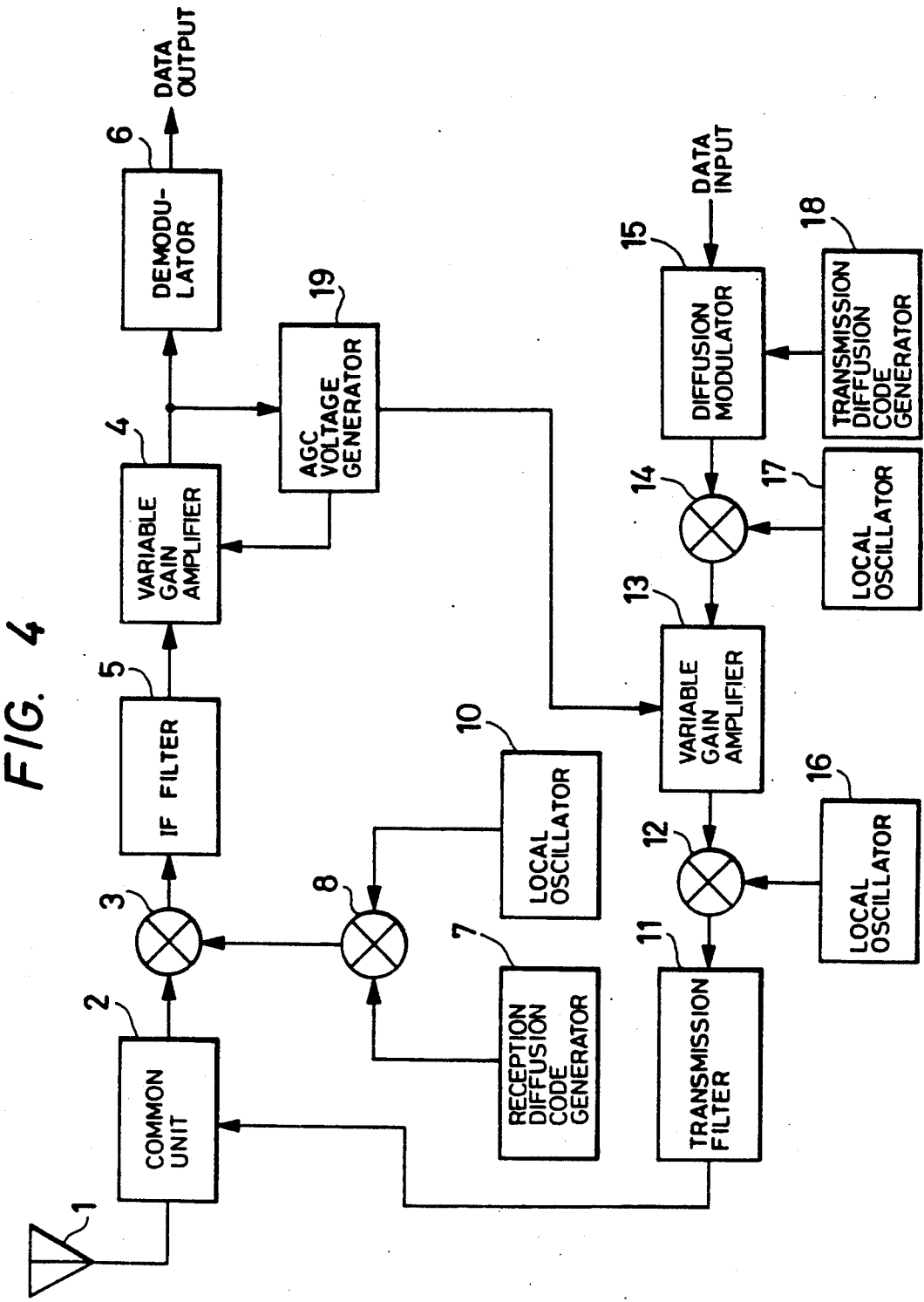
FIG. 4 shows a block diagram of one embodiment of the present invention.

FIG. 4 shows a block diagram of a spectrum diffusion communication apparatus in accordance with the present invention. A transmitter is first explained.

Source data which is digital data, is diffusion-modulated (spread-modulated) by a diffusion (spread) modulator 15 by using a predetermined diffusion code generated by a code generator 18. The output of the diffusion modulator 15 is multiplied by a mixer 14 with a signal of a predetermined frequency generated by a local oscillator 17. Accordingly, the output of the mixer 14 has a predetermined intermediate frequency and it is amplified by a variable gain amplifier 13. The output of the variable gain amplifier 13 is frequency-converted by the mixer 12 and the local oscillator 16.

The output of the mixer 12 is supplied to a filter 11 where only a required band component is extracted and it is transmitted from an antenna 1 through a common unit 2.

In a receiver, a received signal from the common unit 2 is supplied to a mixer 3. Another input to the mixer 3 is a signal mixed by a mixer 8, which receives a predetermined diffusion code generated by a diffusion code generator 7 and a signal generated by a local oscillator 10. The local oscillator 10 generates a signal of a frequency which is shifted from a receiving frequency (frequency of carrier of a desired signal) by the intermediate frequency.

If the diffusion codes used in the transmitter and receiver for modulation and demodulation are phase-synchronized, an intermediate signal having a band width corresponding to the source data is produced at the output of the mixer 3. The output of the mixer 3 is supplied to an intermediate frequency filter 5 which has a band width corresponding to the source data. An intermediate frequency signal produced by the intermediate frequency filter 5 is amplified by a variable gain amplifier 4 and the output of the variable gain amplifier 4 is applied to a demodulator 6 which demodulates the source data.

The variable gain amplifier 4 voltage-controls its gain by an AGC (automatic gain control) voltage generated by an AGC voltage generator or level compensator 19, which receives the output of the variable gain amplifier 4 and controls the amplifier 4 to keep a level (i.e., a signal amplitude at a point in a transmission system measured in comparison with a reference) thereof constant.

A gain of the variable gain amplifier 13 of the transmitter is also controlled by the AGC voltage generated by the AGC voltage generator 19 provided in the receiver.

In an initial state, that is, when communication between stations has not been established, the received signal is diffused by the diffusion code generated by the diffusion code generator 7 of the receiver. Accordingly, the output of the intermediate frequency filter 5 is small and the AGC voltage generator 19 controls to increase the gains of the variable gain amplifiers 4 and 13.

If a signal from another station corresponding to the receiving channel, that is, a signal corresponding to the diffusion code generated by the receiver diffusion code generator 7 is applied to the antenna 1, the output of the intermediate frequency filter 5 increases after the phase synchronization of the diffusion codes for the modulation/demodulation has been established. As a result, the output signal of the amplifier 4 increases and the AGC voltage generator 19 controls the gain of the variable gain amplifier 4 so that the output of the variable gain amplifier 4 is kept at an appropriate level. The AGC voltage also controls the transmitter variable gain amplifier 13. The AGC voltage generator 19 determines a distance to the other station by the level of the received signal. If it determines that the distance is short, it lowers the level of the transmitting signal in accordance with the distance. For a near station, the transmitting signal level is low, and for a distant station, the transmitting signal level is high. Accordingly, the electric field strength at the antenna of the other station is of proper level.

On the other hand, when the signal is to be sent from the present station to the other station, the gain of the variable gain amplifier 13 is initially controlled to a high level as described above. Accordingly, the electric field strength at the antenna of the other station is unduly high. However, as the other station responds, the input signal to the AGC voltage generator 19 increases. As a result, the AGC voltage generator 19 controls the gain of the variable gain amplifier 13 such that the electic field strength at the antenna of the other station is at the proper level.

Figure 5:
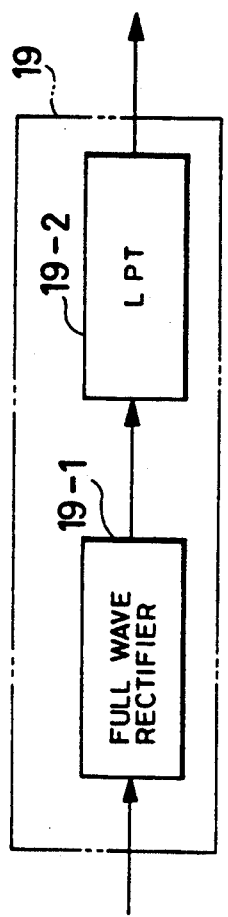
FIG. 5 shows a block diagram of an AGC voltage generator shown in FIG. 4.

FIG. 5 shows a configuration of the AGC voltage generator 19. Numeral 19-1 denotes a full wave rectifier and numeral 19-2 denotes a low pass filter.

Figure 6:
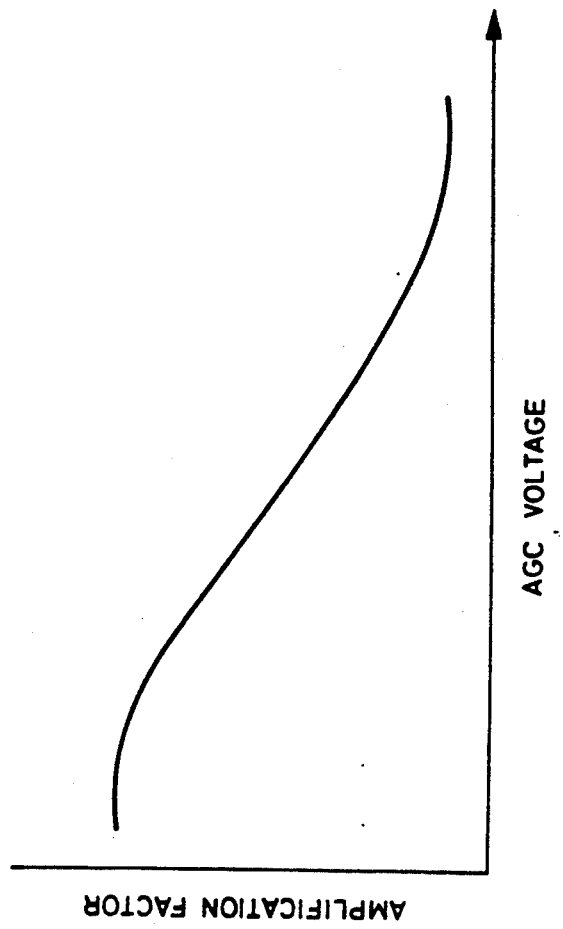
FIG. 6 shows a relationship between an AGC voltage and an amplification factor in variable gain amplifiers 4 and 13.

FIG. 6 is a graph showing a relationship between the AGC voltages in the variable gain amplifiers 4 and 13 and the amplification factor. Scales of the ordinates for the variable gain amplifiers 4 and 13 are not necessarily equal.

A manner of control of the transmitting output by the reverse-diffusion demodulated output of the received signal is explained in detail.

When there is no other station signal corresponding to the receiving channel, the output of the intermediate frequency filter 5 of FIG. 4 includes only a narrow band noise and it is of low power. The output of the intermediate frequency filter 5 is amplified by the variable gain amplifier 4 and the output of the amplifier 4 is applied to the full wave rectifier 19-1 of FIG. 5. Only a DC component is extracted by the low pass filter 19-2 and it is supplied to the variable gain amplifiers 4 and 13 of FIG. 4 as the AGC voltage. Since the output of the intermediate frequency filter 5 is now of low power, the AGC voltage is also low. Because of low AGC voltage, the amplification factors of the variable-gain amplifiers 4 and 13 are large as shown in FIG. 6.

When the other station signal corresponding to the receiving channel is received and the synchronization is established, the reverse-diffusion demodulated output of the received signal appears, in addition to the noise, at the output of the intermediate frequency filter 5 of FIG. 4. Accordingly, the output of the intermediate frequency filter 5 has a power corresponding to the strength of the reverse-diffusion demodulated output of the received signal. The output of the intermediate frequency filter 5 is amplified by the variable gain amplifier 4, and the output of the amplifier 4 is applied to the full wave rectifier 19-1 and the low pass filter 19-2 of FIG. 5 which convert it to a DC voltage signal corresponding to the strength of the reverse diffusion demodulated output, and outputs it as the AGC voltage. The amplification factor of the variable gain amplifier 4 of FIG. 4 lowers as the AGC voltage rises.

In this manner, the amplification factor of the variable gain amplifier 4 is controlled by the receiver variable gain amplifier 4 and the AGC voltage generator 19 which reversely feeds back to the amplifier 4. The AGC voltage varies to control the amplification factor in accordance with the input to the variable gain amplifier 4 so that the output of the amplifier 4 is kept constant. Except for a transient state, the AGC voltage always reflects the strength of the reverse-diffusion demodulated output of the received signal.

The AGC voltage is supplied to the transmitter variable gain amplifier 13 having the same characteristic as the variable gain amplifier 4 so that the amplification factors of the variable gain amplifiers 4 and 13 are proportional to each other. This means that the reverse diffusion demodulated output of the received signal is always inversely proportional to the transmission output.

Thus, if the communicating stations are configured as shown in FIG. 5, the transmitting power is controlled such that the electric field strength at the antenna of the receiving station is at the proper level. Accordingly, since the electric field strength at the antenna of the receiving station is always kept at the proper level and the problem of distance caused by different distances between the stations is solved. When only the moving stations are configured as shown in FIG. 4, the above advantage is attained.

When a plurality of moving stations are multiconnected through a single fixed station, up-lines from the moving stations to the fixed station and down-lines from the fixed station to the moving stations usually have different carrier frequencies. Accordingly, the up-lines and the down-lines may be separately designed. The distance to the fixed station differs from moving station to moving station. For the uplines, if the transmission outputs of the plurality of moving stations are equal, the transmission output from a very distant station is very weak compared to other moving stations. Accordingly, the source data from the distant station may not be reproduced. On the other hand, for the down-lines, since the transmission outputs of the fixed station for the plurality of moving stations are equal, each moving station receives the transmission signals to all moving stations as the same level inputs. Since the number of moving stations to which one fixed station transmits the signals is limited, each moving station can reproduce the source data from the desired signal. In this manner, the problem of distance is avoided for the down line.

Accordingly, in such a multi-connection communication, the problem of distance is solved if the transmission powers of the moving stations are controlled only in the up-lines.

In a communication apparatus of a communication method other than the spectrum diffusion communication, a power consumption can be saved by controlling a transmission power in accordance with a distance to a receiving station. Namely, for a receiving station at a short distance, a smaller transmission power than a maximum transmission power is used so that the transmission power is saved compared to a case where a large transmission power is always used. Since unduly high power is not used, undue disturbance of other communication can be avoided.

Figure 7:
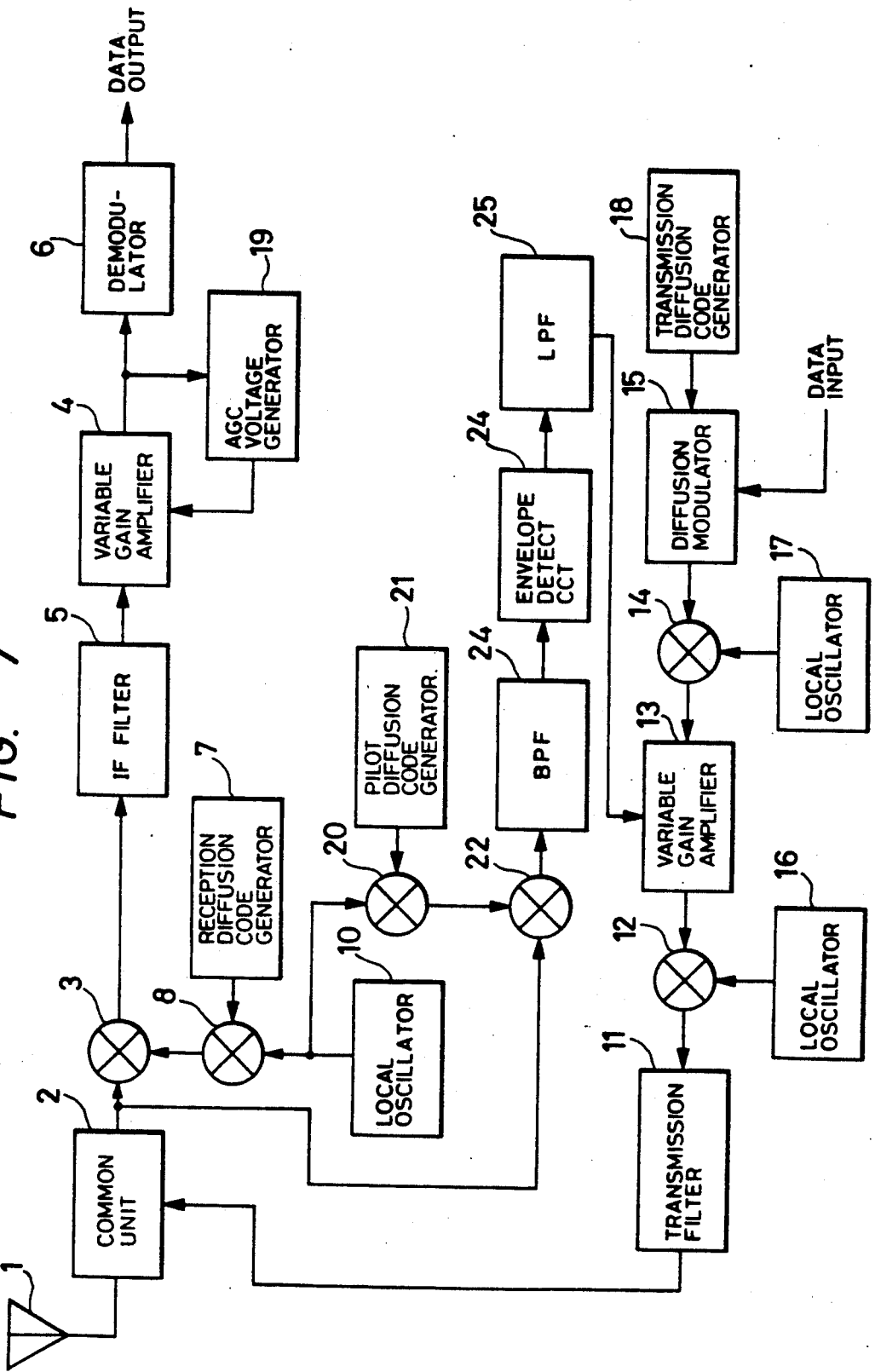
FIG. 7 shows a block diagram of another embodiment of the present invention.

FIG. 7 shows a block diagram of an embodiment in which moving stations control the transmission powers in accordance with a pilot signal sent from the fixed station.

In the present embodiment, in order to control the gain of the transmitter variable gain amplifier 13, circuits 20-25 are provided. Numeral 20 denotes a mixer which multiplies the output of the receiver local oscillator 10 with the output of a pilot diffusion (spread) code generator 21 and supplies a product to a correlator 22. A received signal branched by the common unit 2 is applied to another input of the correlator 22.

The pilot diffusion code generator 21 generates a diffusion code corresponding to the pilot diffusion signal normally sent from the multi-connection apparatus. The output of the correlator 22 is supplied to a band pass filter 23 which eliminates unnecessary frequency components from the correlated signal. The output of the band pass filter 23 is supplied to an envelope detector 24, which envelope-detects an input signal. The detected signal is applied to a low pass filter 25 which comprises an integrator and filters the input signal to produce a voltage signal proportional to a received electric field strength of the pilot signal.

When two (or more) moving stations configured as shown in FIG. 7 are multi-connected to the multiconnection apparatus which is a single fixed station, the fixed station normally sends a pilot signal diffused by a specific diffusion code. This pilot signal may be common to the plurality of moving stations. The multi-connection apparatus of the present embodiment needs to send only one pilot signal in addition to the signals sent by the conventional multi-connection apparatus. Since this signal is sent even when the communication is not established, the moving station having the configuration shown in FIG. 7 can normally receive the pilot diffusion signal. Accordingly, the gain of the transmitter variable gain amplifier 13 is always set such that the received power at the fixed station is kept at a proper level. The circuits 20-22 of FIG. 7 reverse-diffuse the pilot diffusion signal to convert the pilot diffusion signal to the intermediate frequency signal. The pilot signal is envelope-detected by the detector 24 and the output of the detector 24 is supplied to a low pass filter 25 which converts it to a time-averaged signal of a voltage signal proportional to the received electric field strength of the pilot signal. The output of the low pass filter 25 is supplied to the variable gain amplifier 13 which controls the transmission power of the moving station in accordance with the received electric field strength of the pilot signal at the moving station. As a result, the received electric field strength at the fixed station is properly controlled.

In this manner, the distance to the other station is determined based on the received power and the transmission power is controlled in accordance with the received voltage so that the transmission power is low if the other station is at a short distance. If the other station is at a distant place, the transmission power is high. As a result, the received power of the other station can be limited in a proper range and the problem of distance is solved.

When the pilot signal can be always received, the system is more reliable.

Accordingly, the spectrum diffusion communication among a number of communication apparatus by the multiconnection is attained.

While preferred embodiments of the present invention have been described, the present invention is not limited to those embodiments but various modifications thereof may be made without departing from the scope of claims.

I claim:

1. A communication apparatus comprising:
   receiving means for receiving a signal including a signal from a partner station;
   conversion means for converting the signal received by said receiving means in accordance with a diffusion code, wherein the diffusion code is determined in accordance with a diffusion code used in transmission by the partner station;
   control signal generating means coupled to the conversion means for generating a control signal corresponding to an output level of said conversion means;
   transmission means for transmitting data to the partner station; and
   transmission control means coupled to the transmission means for controlling a transmission level of a signal output of said transmission means in accordance with the control signal generated by said control signal generating means.

2. A communication apparatus according to claim 1, wherein said receiving means receives a radio signal.

3. A communication apparatus according to claim 1, wherein said transmission means transmits a radio signal.

4. A communication apparatus according to claim 1, wherein said transmission control means controls the transmission level of the signal output of said transmission means such that the transmission level of the signal output of said transmission means is inversely proportional to the output level of said conversion means.

5. A communication apparatus according to claim 1, further comprising:
   demodulation means for demodulating the signal received by said receiving means; and
   demodulation control means for controlling the level of the demodulated signal of said demodulation means in accordance with the control signal generated by said control signal generating means.

6. A communication apparatus according to claim 5, wherein said demodulation control means controls said demodulation means to keep the level of the demodulated signal output therefrom constant.

7. A communication apparatus according to claim 1, further comprising:
   amplifier means for amplifying the signal received by said receiving means; and
   amplification control means for controlling an amplification factor of said amplifier means in accordance with the control signal generated by said control signal generating means.

8. A communication apparatus according to claim 7, wherein said amplification control means controls the amplification factor of said amplifier means to keep the output level thereof constant.

9. A communication apparatus according to claim 1, wherein said transmission means includes transmission data input means and transmits the data input by said transmission data input means after spectrum diffusion.

10. A communication apparatus according to claim 1, wherein said receiving means receives a spectrum-diffused signal.

11. A communication system for allowing a plurality of sub-stations to communicate with each other through a main station, each of said sub-stations comprising:
    data transmitting means for transmitting data to the main station; and
    control means coupled to the data transmitting means for controlling a data transmission level of data transmitted from said data transmitting means to the main station at the start of data transmission to the main station in accordance with a level of a pilot signal received from said main station before the start of data transmission from said data transmission means to the main station.

12. A communication apparatus according to claim 11, wherein said data transmission means transmits spectrum diffused data.

13. A communication apparatus according to claim 11, wherein said control means receives a pilot signal from said main station, said pilot signal being a signal converted on the basis of a pilot diffusion code.

14. A communication apparatus according to claim 13, wherein said control means comprising receiving means for receiving a signal, converting means for converting the signal received by said receiving means in accordance with the pilot diffusion signal and level control means for controlling a transmission level of said data transmission means in accordance with an output level of said converting means.

15. A communication apparatus according to claim 11, wherein said control means controls the transmission level of said data transmission means to be inversely proportional to the received pilot signal.

16. A system according to claim 11, wherein said main station transmits the pilot signal repeatedly.

17. A spectrum diffusion communication system for allowing a plurality of sub-stations to communicate with each other through a main station, each of said sub-stations comprising:
    data transmitting means for transmitting spectrum diffusion data to the main station; and
    control means coupled to the data transmitting means for controlling a transmission level of the spectrum diffusion data transmitted by said data transmitting means to the main station at the start of transmission of spectrum diffusion data to the main station in accordance with a level of a pilot signal received from the main station before the start of transmission of spectrum diffusion data from the data transmitting means to the main station.

18. A communication apparatus according to claim 17, wherein said control means receives a pilot signal from a main station, said pilot signal being a signal converted on the basis of a pilot diffusion code.

19. A communication apparatus according to claim 18, wherein said control means comprises receiving means for receiving a signal, converting means for converting the signal received by said receiving means in accordance with the pilot diffusion signal and level control means for controlling a transmission level of said data transmission means in accordance with an output level of said converting means.

20. A communication apparatus according to claim 17, wherein said control means controls the transmission level of said data transmission means to be inversely proportional to the received pilot signal.

21. A system according to claim 17, wherein said main station transmits the pilot signal repeatedly.

22. A communication apparatus comprising:
    receiving means for receiving a signal including a signal from a partner station through first and second channels, wherein said signal is a spectrum-diffused signal and diffusion codes are different for the first channel and the second channel;

demodulating means coupled to the receiving means for demodulating the signal received from the partner station through the first channel to obtain original data;

detecting means coupled to the receiving means, for detecting a level of the signal from the partner station received through the second channel; and transmitting means coupled to the detecting means for transmitting a signal with a signal level corresponding to the signal level detected by said detecting means.

23. An apparatus according to claim 22, wherein said transmitting means transmits a spectrum diffused signal.

24. An apparatus according to claim 22, wherein said transmitting means comprises control means for controlling a transmission level to be in inverse proportion to the level detected by said detecting means.

25. An apparatus according to claim 22, wherein said demodulating means demodulates received data amplified according to a level detected by said detecting means to obtain original data.

26. A communication apparatus, comprising:

transmitting means for transmitting data to a main station;

receiving means for receiving a reference signal from the main station; and control means coupled to the receiving means for controlling a transmission level of the data transmitted by said transmitting means to the main station at the start of data transmission to the main station in accordance with a reception level of the reference signal before the start of data transmission from said transmitting means to the main station.

27. An apparatus according to claim 26, wherein said receiving means comprising demodulating means for demodulating an information signal from the main station.

28. An apparatus according to claim 27, wherein said demodulating means comprises amplifying means for amplifying an information signal in accordance with a reception level of the reference signal.

29. An apparatus according to claim 26, wherein said control means controls a transmission level of said transmission means to be in inverse proportion to a reception level of the reference signal.

30. An apparatus according to claim 26, wherein said transmission means transmits spectrum-diffused data.

31. An apparatus according to claim 26, wherein said receiving means receives a spectrum-diffused signal.

32. An apparatus according to claim 26, wherein the main station transmits the reference signal repeatedly.

* * * * *

UNITED STATES PATENT AND TRADEMARK OFFICE
CERTIFICATE OF CORRECTION

PATENT NO. : 5,199,045

DATED : March 30, 1993

INVENTOR(S) : ICHIRO KATO

It is certified that error appears in the above-identified patent and that said Letters Patent is hereby corrected as shown below:

COLUMN 1

Figure 1:
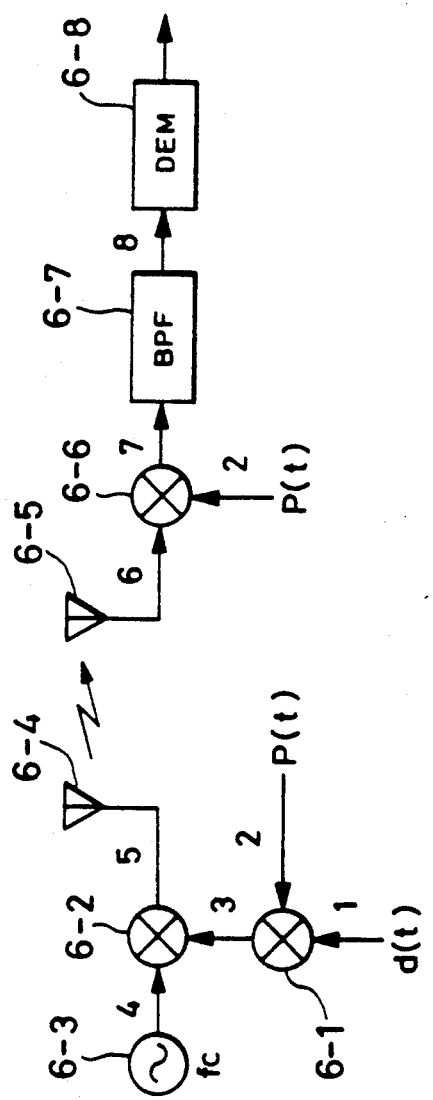
FIG. 1 shows a block diagram of a spectrum diffusion communication apparatus.
Figure 2:
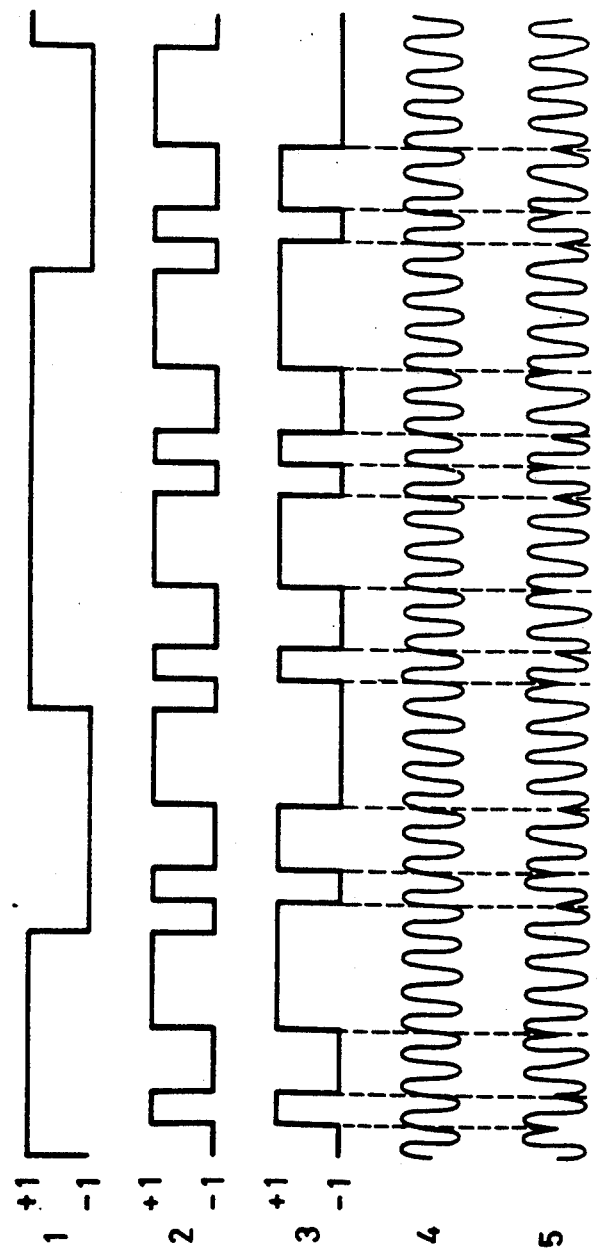

Line 51, "antenna 1-3." should read --antenna 6-4.--.
Line 53, "antenna 1-5" should read --antenna 6-5-- and "FIG. 6" should read --FIG. 1--.

COLUMN 5

Line 36, "uplines," should read --up-lines,--.
Line 49, "down line." should read --down-line.--.

COLUMN 6

Line 62, "apparatus" should read --apparatuses--.

UNITED STATES PATENT AND TRADEMARK OFFICE
CERTIFICATE OF CORRECTION

PATENT NO. : 5,199,045
DATED : March 30, 1993
INVENTOR(S) : ICHIRO KATO

Page 2 of 2

It is certified that error appears in the above-identified patent and that said Letters Patent is hereby corrected as shown below:

<u>COLUMN 8</u>

```
Line  9,  " apparatus" should read --system--.
Line 12,  "apparatus"  should read --system--.
Line 16,  "apparatus"  should read --system--.
Line 17,  "comprising" should read --comprises--.
Line 24,  "apparatus"  should read --system--.
Line 28,  "said" should read --the--.
Line 45,  "apparatus"  should read --system--.
Line 49,  "apparatus"  should read --system--.
Line 57,  "apparatus"  should red --system--.
Line 61,  "said" should read --the--.
```

Signed and Sealed this

Twenty-sixth Day of April, 1994

Attest:

BRUCE LEHMAN

Attesting Officer     Commissioner of Patents and Trademarks